United States Patent [19]

Honda

[11] 4,064,478
[45] Dec. 20, 1977

[54] FLASHER DISPLAY TYPE FISH FINDER

[76] Inventor: Keisuke Honda, 37, Shinyoshi-cho, Toyohashi, Aichi, Japan

[21] Appl. No.: 741,799

[22] Filed: Nov. 15, 1976

[30] Foreign Application Priority Data

Nov. 29, 1975   Japan .................................. 50-142641

[51] Int. Cl.² .............................. G01S 9/70; G01S 7/64
[52] U.S. Cl. ..................................................... 340/3 C
[58] Field of Search ........................ 340/1 C, 3 C, 3 F

[56] References Cited

U.S. PATENT DOCUMENTS

| | | | |
|---|---|---|---|
| 3,732,945 | 5/1973 | Lavigne | 340/3 A X |
| 3,750,095 | 7/1973 | Olesen | 340/1 C X |
| 3,835,447 | 9/1974 | Lowrance | 340/3 C X |

Primary Examiner—Richard A. Farley
Attorney, Agent, or Firm—Burgess, Ryan and Wayne

[57] ABSTRACT

Disclosed is a flasher display type fish finder wherein the output from a master digital oscillator is converted by a first frequency divider into a pulse train which in turn is converted by a serial-to-parallel converter into scanning or parallel pulses which are sequentially applied to a received- or echo-signal output device; and echo signal is applied through a received- or echo-signal distribution circuit to the output device; and SCRs to each which are impressed simultaneously both the scanning or parallel pulse and the echo signal is enabled to conduct and a light emitting element connected to the conducted SCR is turned on, displaying targets.

2 Claims, 4 Drawing Figures

FLASHER DISPLAY TYPE FISH FINDER

BACKGROUND OF THE INVENTION

The present invention relates to a flasher display type fish finder of the type wherein a light emitting element or elements are turned on electronically for a predetermined time for display.

In the prior art fish finders cathode-ray tubes and strip-chart recorders have been widely used as a display device. With cathode-ray tubes large in size, it is difficult to make the fish finders compact in size. The strip-chart recorders have an advantage in that the records may be kept for future references or studies, but they have also a distinct disadvantage that a recording-pen driving mechanism including a motor is complex in construction.

SUMMARY OF THE INVENTION

One of the objects of the present invention is therefore to provide a flasher display type fish finder which may completely eliminate mechanical parts and therefore may ensure a long service life.

Another object of the present invention is to provide a flasher display type fish finder wherein light emitting elements are used for display.

A further object of the present invention is to provide a flasher display type fish finder wherein light emitting elements may be turned on for a predetermined time by the memory function or conduction of SCRs.

Briefly stated, to the above and other ends, the present invention provides a flasher display type fish finder comprising a master digital oscillator, a first frequency divider for converting an output from said master digital oscillator into pulse outputs, a serial-to-parallel converter for converting serial pulse outputs from said first frequency divider into a predetermined number of parallel pulse outputs which are sequentially derived from a plurality of output terminals equal in number to said predetermined number of parallel pulse outputs and equally spaced apart in time and cycled at a predetermined repetition rate, a received-signal output device with a plurality of input terminals connected to said a plurality of output terminals, respectively, of said serial-to-parallel converter and with a plurality of output terminals equal in number to said a plurality of output terminals of said serial-to-parallel converter, a plurality of SCRs having their control or gate terminals connected to said output terminals, respectively, of said received-signal output device, a plurality of light emitting elements connected to said a plurality of SCRs, respectively, a second frequency divider connected to an output terminal of said first frequency divider for generating an output which lasts equal in time to one cycle of said predetermined number of parallel pulse outputs, a received-signal distribution circuit responsive to the output from said second frequency divider for energizing said received-signal output device, a trigger circuit responsive to an pulse output from said second frequency divider corresponding to the first or initial parallel pulse output from said serial-to-parallel converter for generating a trigger pulse, and a transmitter-receiver for amplifying the trigger pulse from said trigger circuit and applying the amplified trigger pulse to a ultrasonic transducer, whereby when an echo ultrasonic sound wave pulse reflected from a target is received and converted by said transducer into an electrical received-signal, said received-signal is amplified by said transmitter-receiver and transmitted to said received-signal distribution circuit which in turn transmits said received-signal to said received-signal output device so that one of said plurality of SCRs whose control or gate terminal is applied with one of said a predetermined number of parallel pulse outputs from said serial-to-parallel converter is enabled to conduct and consequently one of said a plurality of light emitting elements connected to said conducted SCR is turned on to display the target.

DESCRIPTION OF THE PREFERRED EMBODIMENTS

Figure 1:
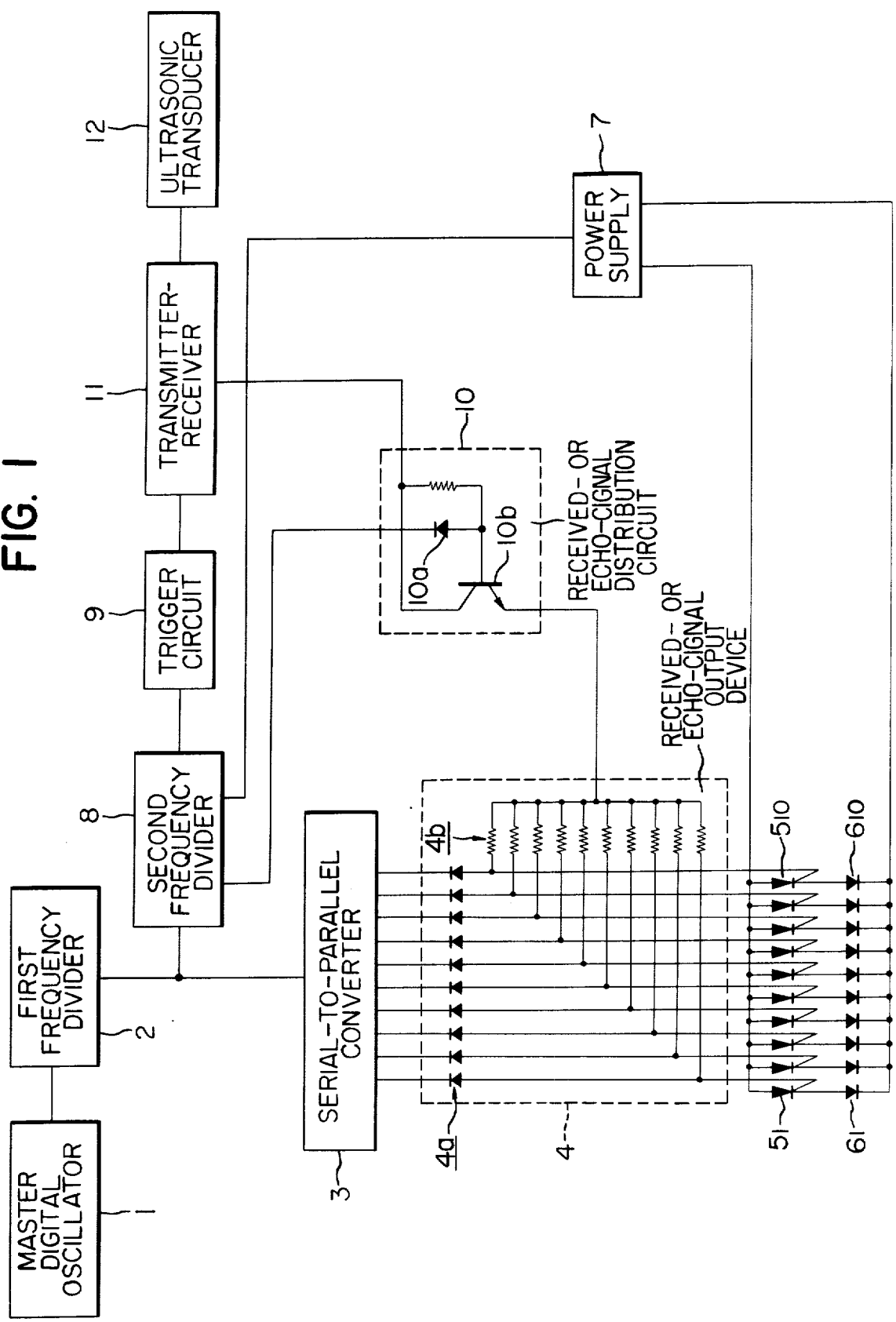
FIG. 1 is a block diagram of a first embodiment of the present invention.
Figure 2:
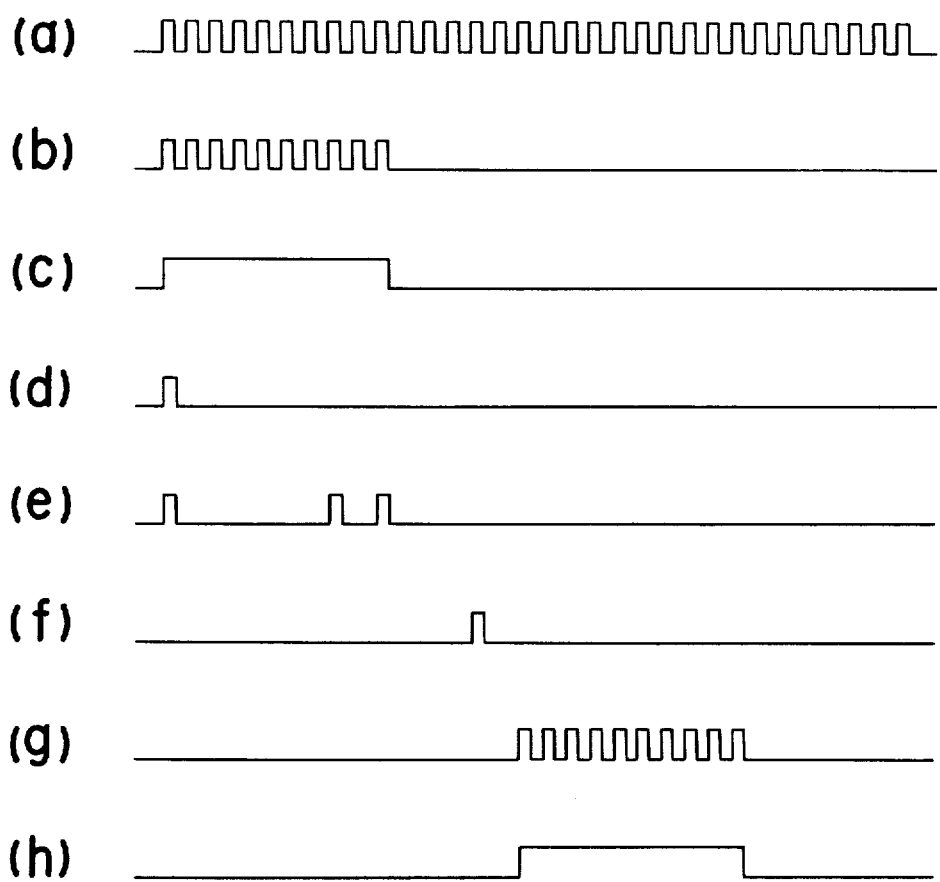
FIG. 2 shows waveforms of signals at various points in the diagram shown in FIG. 1.

First Embodiment, FIGS. 1 and 2

In FIG. 1 there is shown in block diagram of a first embodiment of a flasher display type fish finder in accordance with the present invention comprising a master digital oscillator 1, a first frequency divider 2, a serial-to-parallel converter 3, a received- or echo-signal output device 4, a plurality of SCRs 5, a plurality of light emitting elements 6, a power supply 7, a second frequency divider 8, a trigger circuit 9, a received- or echo-signal distribution circuit 10, a transmitter-receiver 11 and an ultrasonic transducer 12.

An output from a master digital oscillator 1 is converted by the first variable frequency divider 2 into pulses the frequency of which may be varied depending upon a desired range, and a pulse train from the first frequency divider 2 is applied to the serial-to-parallel converter 3 which converts serial pulses into a group of a predetermined number of parallel or scanning pulses which are equally spaced apart in time and appear sequentially at a plurality of output terminals of the converter 3. In this embodiment the converter 3 is described and shown as having ten output terminals, but it will be understood that they may be suitably increased or decreased as needs demand. The parallel or scanning pulses are applied to the received- or echo-signal output device 4 with output terminals equal in number to the output terminals of the converter 3 and connected to control or gate terminals of SCRs $5_1$ through $5_{10}$ whose output or cathode terminals are connected to the terminals of light emitting elements $6_1$ through $6_{10}$. The other terminals of the light emitting elements $6_1$ through $6_{10}$ and the input or anode terminals of SCRs $5_1$ through $5_{10}$ are connected to the power supply 7 including a reset circuit.

The output pulses from the first frequency divider 2 are also applied to the second frequency divider 8 which in turn gives a first output pulse to the trigger circuit 9 and a second output pulse to the received- or echo-signal distribution circuit 10 simultaneously when the initial paralle or scanning pulse is transmitted from the converter 3 to the output device 4. The second output pulse lasts for a period equal to one cycle of the parallel or scanning pulses; that is, from the time when the initial parallel or scanning pulse rises until the time when the last parallel or scanning pulse falls. A predetermined time after the fall of the last parallel or scanning pulse, the second frequency divider 8 gives a third output or reset pulse to the power supply 7 so that a reverse voltage is applied to all of SCRs and consequently those which have been conducted are turned off or disabled. In response to the first output pulse from the second frequency divider 8, the trigger circuit 9 generates a trigger pulse which is amplified by the transmitter-receiver 11 and applied to the transducer 12 so that an ultrasonic sound pulse is transmitted into the body of water.

Next referring further to FIG. 2, the mode of operation of the first embodiment will be described in more detail. As shown in FIG. 2(a), the first frequency divider 2 successively generates a pulse train at a predetermined pulse-repetition frequency. In response to this pulse train, the serial-to-parallel converter 3 generates parallel or scanning pulses which appear sequentially at the output terminals as shown in FIG. 2(b) and applied to the received- or echo-signal output device 4. Because the input terminals of the output device 4 are connected to cathodes of diodes 4a as shown in FIG. 1, no output appears at the output terminals of the output device 4 in response to the parallel or scanning pulses from the converter 3.

In response to the initial pulse from the first frequency divider 2 corresponding to the initial parallel or scanning pulse from the converter 3, the second frequency divider 8 gives the second output pulse shown in FIG. 2(c) to the distribution circuit 10 for a period equal to one cycle of parallel or scanning pulses. As shown in FIG. 1, the distribution circuit 10 consists of a diode 10a and a transistor 10b, and because the output pulse from the second frequency divider 8 is applied to the cathode of the diode 10a, no output signal is derived from the distribution circuit 10 in response to the output pulse from the second frequency divider 8.

In response to the first output pulse from the second frequency divider 8 which pulse is generated simultaneous with the initial parallel or scanning pulse, the trigger circuit 9 gives a trigger pulse as shown in FIG. 2(d) to the transmitter-receiver 11 which amplifies it and applies it to the transducer 12 which in turn converts it into an ultrasonic sound pulse to be transmitted into the water. Concurrently, a pulse signal is transmitted from the transmitter-receiver 11 to the transistor 10b of the distribution circuit 10. At the time when this pulse signal is applied to the distribution circuit, the output from the second frequency divider 8 is applied to the diode 10a so that the transistor 10b is enabled to conduct. The output from the transistor 10b is transmitted through a plurality of parallel connected resistors 4b in the output device 4 to the output terminals thereof. At this instant, the first parallel pulse is derived from the converter 3 so that the first SCR $5_1$ is enabled to conduct and consequently the first light emitting element $6_1$ is turned on, displaying the surface.

An echo pulse which is shown as the second pulse in FIG. 2(e) is received and converted into an electrical pulse by the transducer 12, and the electrical pulse is amplified by the transmitter-receiver 11 and is applied to the distribution circuit 10. The output from the second frequency divider 8 is still being applied to the diode 10a so that the transistor 10b is again enabled to conduct and the output is applied to the resistors 4b of the output device 4. Then the SCR whose control or gate terminal is applied with the parallel pulse from the converter 3 is enabled to conduct and consequently the light emitting element 6 connected to this enabled SCR is turned on, displaying a target.

After the last parallel pulse is derived from the converter 3 the second frequency divider 8 transmits a reset third output pulse to the power supply 7 as shown in FIG. 2(f) so that the latter applies a reverse voltage to the SCRs $5_1$ through $5_{10}$ and the light emitting elements $6_1$ through $6_{10}$ to disable them. Thereafter the outputs are derived again as shown in FIGS. 2(g) and 2(h) from the converter 3 and the second frequency divider 8, and the operation is cycled in the same manner.

Figure 3:
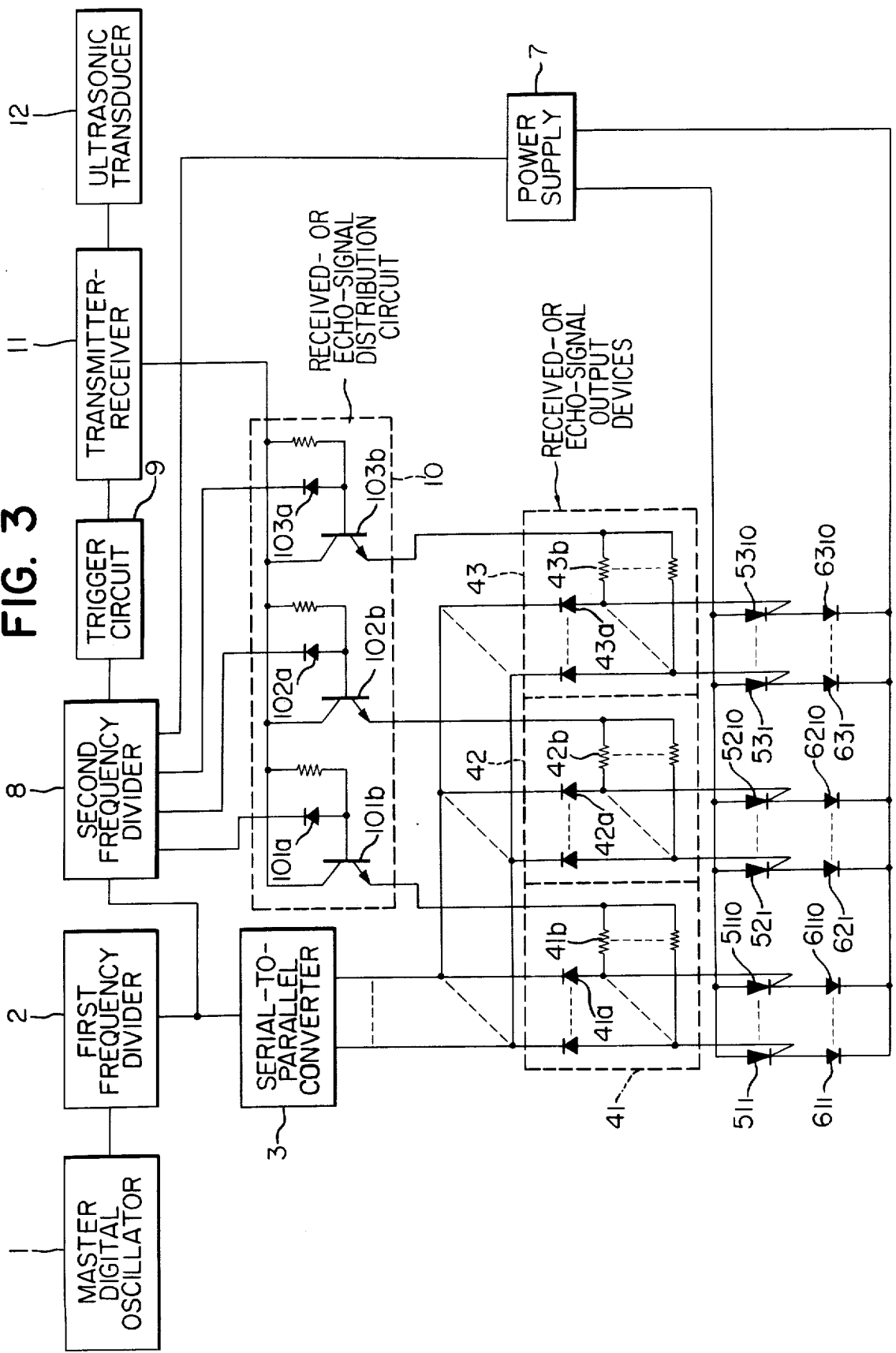
FIG. 3 is a block diagram of a second embodiment of the present invention.
Figure 4:
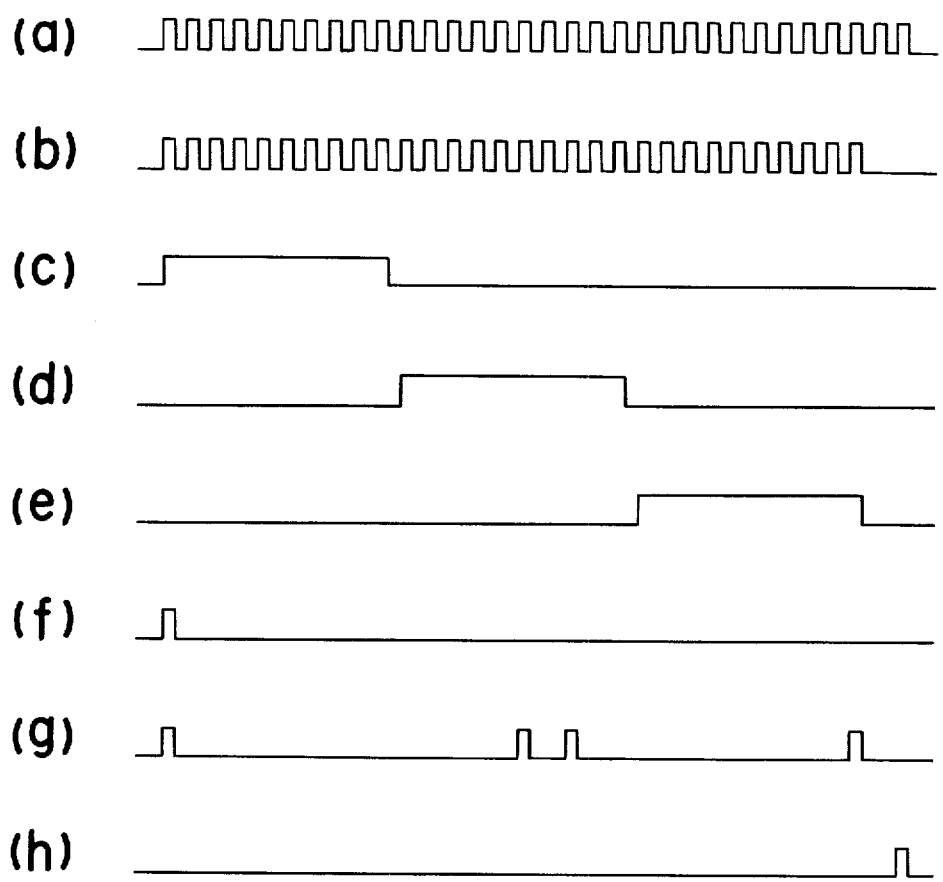
FIG. 4 shows waveforms of signals at various points in the diagram shown in FIG. 3.

Second Embodiment, FIGS. 3 and 4

Whereas in the first embodiment, the SCRs and light emitting elements are equal in number to the output terminals of the serial-to-parallel converter 3, in the second embodiment a plurality of diodes 41a, 42a and 43a of output devices 41, 42 and 43 are connected to the output terminals of the converter 3 so that the number of both SCRs and light emitting elements may be increased. In the second embodiment, three output devices 41, 42 and 43 are shown as being connected to the converter 3, but it will be understood that the number of output devices may be suitably selected as needs demand.

As in the first embodiment, a plurality of parallel-connected resistors 41b, 42b or 43b of each output device 41, 42 or 43 are connected to the emitter of a corresponding transistor 101b, 102b or 103b in the distribution circuit 10. The base of each transistor is connected through a resistor to the transmitter-receiver 11 while the collector is directly connected thereto. The base is also connected through a diode 101a, 102a or 103a to the second frequency divider 8. Except the above described arrangement, the second embodiment is substantially similar in construction to the first embodiment.

Next further referring to FIG. 4, the mode of operation of the second embodiment will be described. In response to a train of pulses (See FIG. 4(a) from the first frequency divider 2, the parallel pulses are sequentially derived from the output terminals of the converter 3 as shown in FIG. 4(b) and applied to the diodes 41a, 42a and 43a of the output devices 41, 42 and 43.

Meanwhile a first output pulse as shown in FIG. 4(c) is applied to the diode 101a of the distribution circuit 10 from the second frequency divider 8 from the time when the first parallel out pulse is derived from the converter 3 to the time when the last output pulse is derived therefrom. In like manner, as shown in FIG. 4(d), a second output pulse from the second frequency divider 8 rises simultaneously when the first parallel output pulse in the next cycle rises and falls simultaneously when the last parallel output pulse falls. The second output pulse is applied to the diode 102a of the distribution circuit 10. In like manner, a third output pulse appears as shown in FIG. 4(e) during a third cycle or period of the parallel output pulses, and is applied to the diode 103a in the distribution circuit 10.

When the echo pulse is transmitted from the transmitter-receiver 11 to the transistors 101b, 102b and 103b, one whose base is connected to the diode 101a, 102a or 103a to which is applied the first, second or third output pulse from the second frequency divider 8 is enabled to conduct, and the output signal is applied to the resistors 41a, 42a or 43a connected to the conducted transistor 101b, 102b or 103b.

More particularly, in synchronism with the first parallel output pulse from the converter 3, a pulse (See FIG. 4(f) ) is transmitted from the trigger circuit 9 through the transmitter-receiver 11 to the transducer 12 so that the latter converts the pulse into ultrasonic sound to be propagated through the water. Concurrently, the received signal (See FIG. 4(g) ) is applied to the distribution circuit 10. At this instant, the first output pulse (See FIG. 4(c) ) is being applied to the diode 101a in the distribution circuit 10 so that the transistor 101b is enabled to conduct and the output signal is transmitted to the resistors 41b. Since the first parallel output pulse is derived from the first output terminal of the converter 3, the first SCR $51_1$ is enabled to conduct and consequently the first light emitting element $61_1$ is turned on, displaying the surface of the water body.

When an echo signal is picked up by the transducer 12, the transmitter-receiver 11 transmits an echo pulse (that is, the second pulse in FIG. 4(g) ) to the distribution circuit 10. At this instant, the second output pulse (See FIG. 4(d) ) is being applied to the diode 102a in the distribution circuit 10, so that the transistor 102b is enabled to conduct and the output signal is transmitted to the resistors 42b of the output device 42. Therefore one of SCRs $52_1$ through $52_{10}$ whose control or gate terminal is connected to the diode 42a to which is applied the parallel output pulse from the converter 3, is enabled to conduct and consequently the light emitting element 62 connected to the conducted SCR 52 is turned on, displaying the first target. In like manner, a second target which is represented by a third pulse in FIG. 4(g) is displayed.

In response to the echo reflected back from the bottom, the transmitter-receiver 11 transmits a pulse (the last pulse in FIG. 4(g) ) to the distribution circuit 10. At this instant, the third output pulse (See FIG. 4(e) ) is being applied to the diode 103a in the distribution circuit 10 so that the transistor 103b is enabled to conduct. Therefore one of SCRs $53_1$ through $53_{10}$ is enabled to conduct and the light emitting element 63 connected to this conducted SCR 53 is turned on in a manner substantially similar to that described above, thus displaying the bottom.

After the fall of the third output pulse, a reset pulse (See FIG. 4(h) ) is transmitted from the second frequency divider 8 to the power supply 7 so that the latter applies a reverse voltage to all SCRs and light emitting elements to reset or disable them. Thereafter next operation is cycled in a manner substantially similar to that described above.

As described above, in the second embodiment the diodes and transistors used in the distribution circuit 10 are greater in number than those used in the first embodiment and the number of output devices is increased accordingly so that the number of both SCRs and light emitting elements may be increased.

In both the first and second embodiments, the range may be suitably selected by controlling the pulse repetition frequency by the first frequency divider 2.

What is claimed is:

1. A flasher display type fish finder comprising
  a. a master digital oscillator,
  b. a first frequency divider for converting the output from said master digital oscillator into pulse outputs,
  c. a serial-to-parallel converter for converting serial pulse outputs from said first frequency divider into a predetermined number of parallel pulse outputs which are sequentially derived from a plurality of output terminals equal in number to said predetermined number of parallel pulse outputs and equally spaced apart in time and cycled at a predetermined repetition rate,
  d. a received signal output device with a plurality of input terminals connected to said plurality of output terminals respectively, of said serial-to-parallel converter and with a plurality of output terminals equal in number to said plurality of output terminals of said serial-to-parallel converter,
  e. a plurality of SCRs having their control or gate terminals connected to said output terminals, respectively, of said received signal output device,
  f. a plurality of light emitting elements connected to said plurality of SCRs, respectively,
  g. a second frequency divider connected to an output terminal of said first frequency divider for generating an output which lasts equal in time to one cycle of said predetermined number of parallel pulse outputs,
  h. a received signal distribution circuit responsive to the output from said second frequency divider for energizing said received signal output device,
  i. a trigger circuit responsive to a pulse output from said second frequency divider corresponding to the first parallel pulse output from said serial-to-parallel converter for generating a trigger pulse,
  j. a transmitter-receiver for amplifying the trigger pulse from said trigger circuit and applying the amplified trigger pulse to an ultrasonic transducer, and
  k. a power supply responsive to an output pulse which is generated by said second frequency divider after the last of said predetermined number of parallel pulse outputs has been derived, for disabling said SCRs, whereby when an echo ultrasonic sound wave pulse reflected from a target is received and converted into an electrical received signal by said transducer, said received signal is amplified by said transmitter-receiver and transmitted to said received signal distribution circuit which in turn transmits said received signal to said received signal output device so that one of said plurality of SCRs whose control or gate terminal is applied with one of said predetermined number of parallel pulse outputs from said serial-to-parallel converter is enabled to conduct and consequently one of said plurality of light emitting elements connected to said conducted SCR is turned on to display the target.

2. A flasher display type fish finder as set forth in claim 1 wherein a plurality of received signal output devices are connected in parallel to said output terminals of said serial-to-parallel converter, a plurality of series-connected SCR and light emitting element circuits are connected to a plurality of output terminals, respectively, of each of said plurality of received signal output devices, and said plurality of received signal output devices are sequentially energized for a time equal to said one cycle of said predetermined number of parallel pulse outputs in response to a pulse output from said second frequency divider corresponding to the first parallel pulse output from said serial-to-parallel converter.

* * * * *

UNITED STATES PATENT OFFICE
CERTIFICATE OF CORRECTION

Patent No. 4,064,478  Dated December 20, 1977

Inventor(s) Keisuke Honda

It is certified that error appears in the above-identified patent and that said Letters Patent are hereby corrected as shown below:

In the drawing and in Figure 1: "cignal" (two occurrences)

should be --signal--.

Column 2, line 47: "undertstood" should be --understood--.

line 64: "paralle" should be --parallel--.

Signed and Sealed this

Thirtieth Day of May 1978

[SEAL]

Attest:

RUTH C. MASON  
Attesting Officer

LUTRELLE F. PARKER  
Acting Commissioner of Patents and Trademarks